June 1, 1965     H. E. DICKERMAN     3,186,160
REGULATOR
Filed May 11, 1962
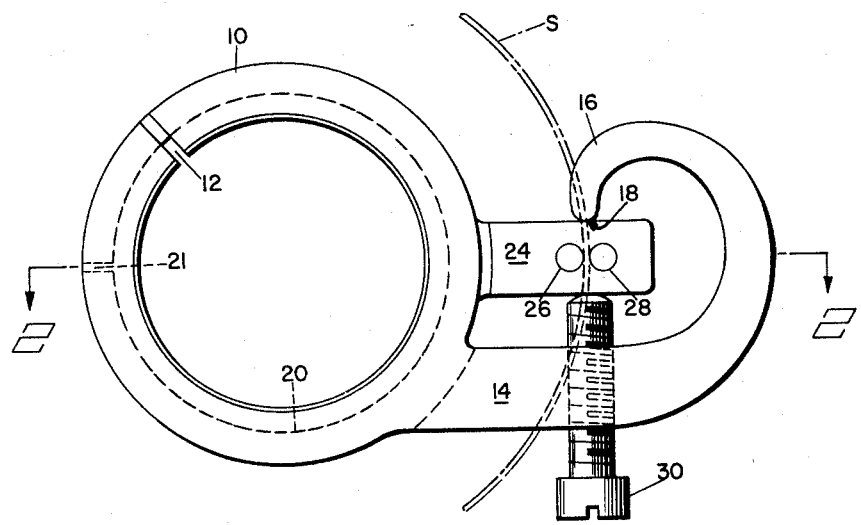
Fig. 1.
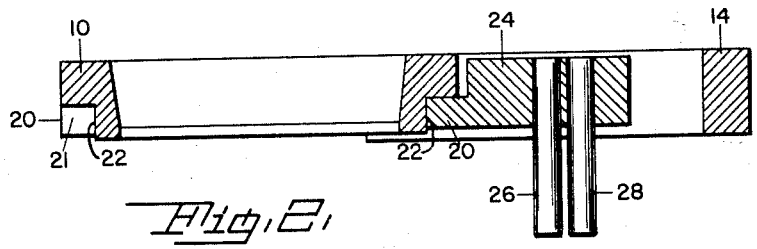
Fig. 2.
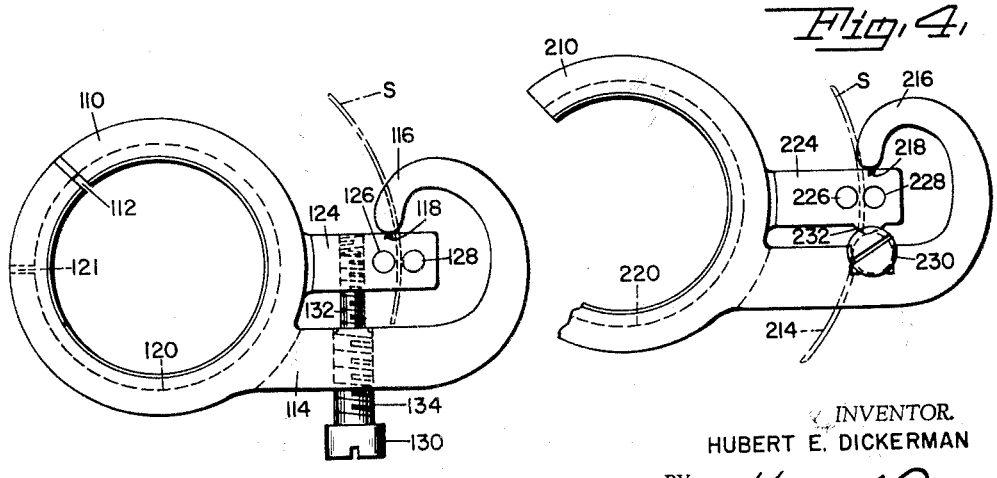
Fig. 4.
Fig. 3.
INVENTOR.
HUBERT E. DICKERMAN
BY Kenwood Ross
ATTORNEY.

United States Patent Office 3,186,160
Patented June 1, 1965

3,186,160
REGULATOR
Hubert E. Dickerman, 276 Farmington Road,
Longmeadow, Mass.
Filed May 11, 1962, Ser. No. 194,020
3 Claims. (Cl. 58—112)

My invention relates to improvements in means for regulating the running speed of a horological instrument by a system which comprehends the locating of the adjustment means for effectuating the fine incremental adjustments of the regulator on the same side of the pivotal point of said regulator as the curb or regulating pins and at a point close to or adjacent said curb pins.

Heretofore, in known prior art devices, it has been common to locate the regulator pins at one side of a pivoting point, which is usually the cap jewel mounting, and to locate the regulating arm which is used for achieving the regulating function at a diametrically opposite position.

In the art of horological instruments, it has long been known that there has existed the inherent problem of subsequent creep arising out of the fact that the regulators have normally been of the so-called whiplash type and have been spring-biased or cam-actuated or otherwise motivated distantly of, and usually, at a situs generally diametrically opposite from the situs of the curb or regulator pins, with the spring or cam means being normally separate from the regulator element itself. The motivating means have been consistently employed for rotating the regulating device, during adjustment, around the pivot means. The regulators have normally included, in addition to the elongated indicator arm, a split ring collared around the pivoting point or means. Experience has shown that such regulators, when so rotated for the adjusting function, have given rise to cramping strains or residual stresses developed between the motivating means and the friction at or around the center or pivot means, the springs or cams or combinations thereof serving to set up or develop these strains and residual stresses resulting in objectionable creep. That is, the said strains and stresses have a capability for remaining at least temporarily following adjustment, only to release themselves eventually therefollowing in a matter of hours or days so as to cause the components to assume new positions and thus to produce the aforesaid creep.

Particularly conducive to creep development is the case of a split ring where one leg of the ring is longer than the other. In such instance, when you move the ring in one direction of rotation, one of the legs will exhibit a tendency to flare outwardly because of frictional contact while the other thereof will exhibit a tendency to cling to the cap jewel mounting, wherefor undue stresses and strains are set up.

As mentioned above, in due time, the components settle down, during what is sometimes identified as a "settling out time," induced by the fact that the components under residual strain finally release themselves and assume their respective more normal positions.

Fully cognizant of the attendant difficulties presented by such characteristics and tendencies, I have herein taught what I identify as a direct means for motivating the regulator, which means is close to or adjacent the regulating pins per se, "direct" being used in the sense that the spring means, screw, and regulator pins are substantially in alignment as to each other for coaction with each other in such manner that, when the screw is moved against the spring, the regulator pins are caused to follow back and forth, as the regulator is slowed down or speeded up, as the case may be. By such novel arrangement, the closeness of the fit around the pivoting point becomes a matter of secondary importance, the problems of spring- ing and residual stresses and strains having been eliminated.

It is, accordingly, a primary object hereof to provide a novel regulator mechanism which will enable more exact and positive adjustments to be made and to be maintained in the timing of a watch than have been possible with known regulating mechanisms, as exemplified by the prior art, to the obvious preclusion of the aforedescribed creep.

While screw adjusting means, cam means, and/or differential screw means are comprehended within the spirit and scope of this disclosure, the essential and salient feature hereof is that the regulator is permitted to be motivated at the same or closely adjacent point where the regulating pins are fixed to the regulator, all to the significant end that the usual windup or stresses developed distantly of the regulator pins are obviated, wherefor the adverse effects thereof upon proper regulation are eliminated.

Stated otherwise, by the short circuiting of these strains and residual stresses and creep producing means, I am better able to provide an improved system for shortening and lengthening the hairspring so as to vibrate it nearer a mean time rate than has heretofore been possible.

Stated in still another way, the design hereof offers a novel arrangement of elements whereby the adjusting means is brought directly onto or adjacent or in line with or opposite the point of attachment of the regulator pins per se to the regulator, all for the aforestated purpose of eliminating the creep.

By the system hereof, the device lends itself to easy and ready adaptation to all existing watches without concomitant concern about additional refinements of hairspring setting or the like, so as to offer a quick and economical means for improving the existing regulators, which can be easily attached by watch repairmen in the field who can readily visualize its usefulness without the need for any special training or education thereconcerning.

And in terms of tooling and manufacturing costs, the invention is admirable.

It should perhaps be here stated, for purposes of clarification that it is visualized, of course, that rough adjustments will be attained by rotating the entirety of the regulator assembly around its pivot point. When a reasonable degree of closeness of regulation has been reached by such method, the so-called "trimming" or incremental movements may then be attained by the fine adjustment means hereof.

The characteristic features which I consider to be novel with my invention, as to its construction and organization and as to its method of operation, will be better understood from a consideration of the following detailed description forming a part of this specification, when read in conjunction with the illustrations in the accompanying drawings, wherein like characters of reference are employed to designate like or corresponding parts throughout the several views and in which:

FIG. 1 is a top plan view of a preferred embodiment of a regulating device incorporating the features and elements of my invention;

FIG. 2 is a sectional view on the line 2—2 of FIG. 1;

FIG. 3 is a top plan view showing a modified form incorporating the features and elements of the invention; and FIG. 4 is a fragmentary top plan view showing another modified form incorporating the features and elements of the invention.

In the drawings, I have not disclosed the related components of a horological instrument. However, it will be understood that the regulating device hereof will be disposed in the usual manner relative to a balance staff and balance bridge of such an instrument, with the regulating or curb pins of the regulating device being disposed adjacent the spiral balance hairspring and balance wheel of the instrument, all as is known in the art.

If desired, the regulating device hereof may be provided with the usual indicator arm (not shown) which will overlie appropriate adjustment indicia etched into or otherwise delineated upon the balance bridge, with the regulating device being readily accessible for manual rotation.

When the regulating device is rotated, it will be appreciated that the effective length of the balance hairspring is changed so that the timing of the watch is changed.

The spiral balance hairspring, shown in phantom in the drawings, will be disposed beneath the balance bridge of the instrument and will have its inner end fixed to the balance staff and its outer end fixed to the balance bridge, all in known manner.

In the preferred embodiment of the invention, illustrated in FIGS. 1 and 2, I have shown a regulating device comprising and annular regulator ring 10, split at 12, as is known, to provide a pair of opposite legs of equal overall length, and having an arm, the main body portion 14 of which extends outwardly therefrom at a side thereof diametrically opposite from said split 12 and coplanar with the main plane of said ring 10.

The free end of the arm is formed to include a gooseneck or bowed tail 16, integral with the main body portion and bowed in a manner so as to be extended back toward the main body portion, as shown. Said gooseneck or bowed tail 16 is provided with a graduated or graded width tapering towards its outer terminal so as to serve the function of a spring means and to facilitate the desired fine spring action. At the outer terminal of said bowed tail, the end face 18 extends toward the main body portion. An annular adjustment ring 20, concentric with regulator ring 10, is disposed in a complemental annular groove 22 provided in the lower planar surface of said regulator ring adjacent its outer periphery, said adjustment ring being rotatable relative to said regulator ring and likewise being split at 21, as shown.

At a side of adjustment ring 20, diametrically opposite from split 21 and coplanar with the main axis of said adjustment ring, an integral arm 24 extends radially outwardly into the area bounded by the end face 18 of the bowed tail portion 16 and the main body portion 14 of the arm of regulator ring 10.

A pair of spaced-apart regulator or curb pins 26 and 28 are fixed to and depend from the lower planar surface of arm 24 in a plane transverse to the axis thereof, wherefor the outermost convolution of a balance hairspring S may be disposed in the plane of, and in the space provided between, the regulator pins 26 and 28.

A transversely-extending screw 30 will be threadedly engaged in a suitable opening through the main body portion 14 and may be engaged by a tool, in known manner, to facilitate rotation thereof relative to said main body portion 14 so as to be moved toward and away from arm 24 of adjustment ring 20, thereby effectuating the fine incremental positioning of said adjustment ring 20 relative to regulator ring 10.

It will be understood that the engagement between regulator ring 10 and adjustment ring 20 will be such that the assembly, in its entirety, may be manually rotated around the pivot point for effectuating rough adjustments in regulation.

When a reasonable degree of closeness of regulation has been reached by such manual rotation, incremental adjustments of a finer, so-called "trimming," nature are obtained by rotation of screw 30, whereby adjustment ring 20 is caused to rotate relative to regulator ring 10 through the force brought to bear by said screw upon arm 24 of said adjustment ring. This movement of adjustment ring 20 relative to regulator ring 10 will be resisted by the bowed arm 16 of the regulator, thus insuring that only fine adjustments of the regulator pins 26 and 28 carried by arm 24 are effectuated.

In the modified form of the invention shown in FIG. 3, a transversley-extending differential screw 130 may be threadedly engaged in suitably aligned and threaded transversely-extending openings extending through an arm 114 of a regulating ring 110 and an arm 124 of an adjustment ring 120, respectively, the shank of said screw having an outermost end portion 132 of a certain thread and an innermost end portion 134 of a different thread. The arm 114 will have a bowed arm 116 terminating at its outer end in an end face 118 abutting arm 124.

Regulating ring 110 will be split at 112 and adjustment ring 120 will be split at 121.

The head of differential screw 130 will be slotted as at 136 for facilitating the rotation thereof by a suitable tool in a manner whereby minute changes in the relative spacing between the arms 114 and 124 respectively may be effectuated.

In practice, and purely for purposes of illustration, outermost end portion 132 of the shank of screw 130 may be provided with 150 threads per inch or a lead of .00666" and the innermost end portion 134 thereof may be provided with 170 threads per inch or a lead of .00588", so that a single turn of said screw will provide a movement of approximately .00078" of arm 124 relative to arm 114.

Regulating pins 126 and 128 will depend downwardly from the arm 124, as in the case of the embodiment of FIGS. 1 and 2.

I have shown, in FIG. 4, another modified form of the invention comprising a regulating ring 120 having an arm 214, a bowed arm 216 and an abutting end face 218, together with an adjustment ring 220 having an arm 224 carrying regulator pins 226 and 228 disposed within the space between bowed arm 216 and arm 214.

An eccentric means 230 is rotatable relative to arm 214 of regulator ring 210 and is disposed so as to contact a cam follower surface 232 provided on arm 224 of adjustment ring 220. Rotation of the eccentric means will effect incremental movement of arm 224 and, of course, the regulator pins carried thereby.

It is believed that the gist of the invention will be clearly understood from the foregoing disclosure, with further analysis thereof being unnecessary. The substitution of equivalents and other changes, modifications and alterations as circumstances may suggest or render expedient, are reasonably contemplated, the invention being susceptible of such without departing from its real spirit or underlying principles.

I particularly point out and distinctly claim as my invention:

1. Regulator mechanism for regulating the running speed of a time keeping device which includes a coil spring for oscillation of a balance wheel relative to a balance cock comprising, a regulating ring frictionally engageable with and pivotable about the balance cock concentrically to the balance wheel, an adjustment ring concentrically related to and interengageable with said regulating ring for relative rotative movement about the balance cock, said regulating ring having a regulating arm unitary therewith and extending outwardly therefrom and characterized by a main body coplanar with and extending outwardly from said regulating ring and a spring having an inner end secured to and extending outwardly from the main body and an arcuate portion spaced from the inner end, said adjustment ring having an adjustment arm unitary therewith and extending radially outwardly therefrom, the adjustment arm being disposed intermediate the main body and arcuate portion of the spring of the regulating arm, regulating pins carried by and depending from the adjustment arm of said adjustment ring and disposed in the plane of and adjacent opposite faces of a convolution of the coil spring, and adjustment means carried by the regulating arm of said regulating ring and bearable against the adjustment arm for adjusting in extremely exact and fine increments the positioning of the adjustment arm and said regulating pins relative to the coil spring.

2. In a regulator for regulating the running speed of an horological instrument which includes a coil spring for oscillation of a balance wheel relative to a balance cock and comprising, a regulator including an annular split ring and an arm unitary with and extending outwardly from the ring and a bowed spring tail extending outwardly from the arm and having an outermost free end facing toward the arm, an annular adjustment ring including a ring concentrically and rotatively interengaged with the ring of said regulator and an arm extending radially outwardly from the ring and carrying regulating pins depending downwardly into the plane of and adjacent opposite faces of a convolution of the coil spring, and actuating means mounted on and movable relative to the arm of said regulator and bearable at one side of and with the spring tail of said regulator bearable at the opposite side of the arm of said adjustment ring whereby the latter may be moved rotatively in fine increments of adjustment to vary the position of the regulating pins relative to the coil spring.

3. In a regulator for regulating the running speed of an horological instrument which includes a coil spring for oscillation of a balance wheel, a system comprehending the locating of an adjustment means for effectuating fine incremental adjustments of the regulator on the same side of the pivotal point of the regulator as the regulating pins and at a point close to or adjacent the regulating pins, and comprising, a regulator constituting an annular split ring portion and an arm portion extending outwardly from the ring portion with the arm portion including a bowed tail portion curved relative thereto and having a free outer extremity spaced therefrom, an adjustment ring constituting an annular split ring portion concentric with and rotatively interengageable with the ring portion of said regulator and an arm portion extending outwardly from the ring portion and carrying regulating pins disposed downwardly in the plane of and adjacent opposite faces of a convolution of the coil spring, and an actuating means mounted on and movable relative to the arm portion of said regulator and bearable against one side of with the outer extremity of the tail portion bearable against the other side of the arm portion of said adjustment ring whereby the latter may be moved rotatively in fine increments of adjustment to vary the position of the regulating pins relative to the coil spring.

References Cited by the Examiner
UNITED STATES PATENTS 736,117    8/03    Lange _____ 58—112

FOREIGN PATENTS 24,677    2/02    Switzerland.

LEYLAND M. MARTIN, *Primary Examiner.*

JOSEPH P. STRIZAK, LEO SMILOW, *Examiners.*